United States Patent
Venkatasubbaiah et al.

(10) Patent No.: US 12,542,739 B2
(45) Date of Patent: Feb. 3, 2026

(54) GENERATING ROUTE DISTINGUISHERS FOR VIRTUAL PRIVATE NETWORK ADDRESSES BASED ON PHYSICAL HARDWARE ADDRESSES

(71) Applicant: Juniper Networks, Inc., Sunnyvale, CA (US)

(72) Inventors: Ganesha Hebbale Venkatasubbaiah, Bangalore (IN); Nikhil Kumar Bansal, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 208 days.

(21) Appl. No.: 16/933,684

(22) Filed: Jul. 20, 2020

(65) Prior Publication Data

US 2022/0021613 A1 Jan. 20, 2022

(51) Int. Cl.
*H04L 45/74* (2022.01)
*H04L 12/46* (2006.01)
*H04L 12/66* (2006.01)
*H04L 45/586* (2022.01)
*H04L 45/64* (2022.01)

(52) U.S. Cl.
CPC .......... *H04L 45/74* (2013.01); *H04L 12/4641* (2013.01); *H04L 12/66* (2013.01); *H04L 45/586* (2013.01); *H04L 45/64* (2013.01)

(58) Field of Classification Search
CPC ....... H04L 45/74; H04L 45/586; H04L 45/64; H04L 12/4641; H04L 12/66
See application file for complete search history.

(56) References Cited

U.S. PATENT DOCUMENTS

| 10,200,274 B1* | 2/2019 | Suryanarayana ....... H04L 45/02 |
| 2018/0123890 A1* | 5/2018 | Merk .................... H04L 45/563 |
| 2021/0211324 A1* | 7/2021 | Dutta ................. H04L 12/4641 |

FOREIGN PATENT DOCUMENTS

| EP | 3382959 A2 | 10/2018 |
| EP | 3457640 A1 | 3/2019 |
| WO | 2013184846 A1 | 6/2013 |

OTHER PUBLICATIONS

Draft-ietf-l3vpn-end-system-06, S. Mackie, etc., Dec. 15, 2016.*
"BGP-Signaled End-System IP/VPNs", draft-ietf-l3vpn-end-system-06, S. Mackie etc., Dec. 15, 2016.*
IETF RFC 7432, "BGP MPLS-Based Ethernet VPN", Sajassi etc., Feb. 2015.*
Rosen et al., "BGP/MPLS IP Virtual Private Networks (VPNs)," Network Working Group, RFC 4364, Feb. 2006, 48 pp.
Mackie et al., "BGP-Signaled End-System IP/VPNs draft-ietf-l3vpn-end-system-06," Network Working Group, Internet-Draft, Dec. 15, 2016, 31 pp.

(Continued)

*Primary Examiner* — Jianye Wu
(74) *Attorney, Agent, or Firm* — Shumaker & Sieffert, P.A.

(57) ABSTRACT

This disclosure describes techniques for improving route advertisements. In one example, a method includes generating, by a network device, a virtual private network address comprising a route distinguisher value and a network address associated with a compute node, the route distinguisher value based on a layer two physical hardware address of the compute node, and outputting, by the network device, a virtual private network route that includes the virtual private network address.

21 Claims, 11 Drawing Sheets

(56) References Cited

OTHER PUBLICATIONS

Bates et al., "Multiprotocol Extensions for BGP-4," Network Working Group, RFC 4760, Jan. 2007, 13 pp.
Saint-Andre, "Extensible Messaging and Presence Protocol (XMPP): Core," RFC 6120, Internet Engineering Task Force (IETF), Mar. 2011, 211 pp.
Hopps, "Analysis of an Equal-Cost Multi-Path Algorithm," RFC 2992, Network Working Group, Nov. 2000, 8 pp.
Extended Search Report from counterpart European Application No. 20201222.5, dated Mar. 22, 2021, 11 pp.
Response to Extended Search Report dated Mar. 22, 2021, from counterpart European Application No. 20201222.5 filed Jul. 22, 2022, 27 pp.
First Office Action and Search Report, and translation thereof, from counterpart Chinese Application No. 202011087745.8 dated Dec. 2, 2022, 29 pp.
Communication pursuant to Article 94(3) EPC from counterpart European Application No. 20201222.5 dated Mar. 12, 2024, 9 pp.
Response to Communication pursuant to Article 94(3) EPC dated Mar. 12, 2024, from counterpart European Application No. 20201222.5 filed Jul. 5, 2024, 14 pp.

\* cited by examiner

GENERATING ROUTE DISTINGUISHERS FOR VIRTUAL PRIVATE NETWORK ADDRESSES BASED ON PHYSICAL HARDWARE ADDRESSES

TECHNICAL FIELD

The disclosure relates to computer networks and, more particularly, to controlling packet forwarding within virtual networks.

BACKGROUND

In a typical cloud data center environment, there is a large collection of interconnected servers that provide computing functionality (e.g., compute nodes) and/or storage capacity (e.g., storage nodes) to run various applications. For example, a data center comprises a facility that hosts applications and services for customers of the data center. The data center for example, hosts all the infrastructure equipment, such as networking and storage systems, redundant power supplies, and environmental controls. In a typical data center, clusters of servers are interconnected via a high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers and, in some cases, may use a logically centralized and physically distributed SDN controller and a distributed forwarding plane in virtual routers that extend the network from physical routers and switches in the data center into a virtual overlay network hosted in virtualized servers (referred to as compute nodes). The SDN controller provides management, control, and analytics functions of a virtualized network and orchestrates the virtual routers by communicating with the virtual routers.

SUMMARY

In general, this disclosure describes techniques for improving route advertisements, such as in software defined networking systems, for example. For example, the disclosure describes techniques for generating and encoding route distinguishers for virtual private network (VPN) addresses using physical hardware addresses for compute nodes that host virtual network destinations. For example, a control node of a Software Defined Networking (SDN) controller generates the route distinguishers based on a layer two Media Access Control address of the compute node that originated a VPN route. The techniques of this disclosure may improve forwarding of traffic flows within Software Defined Networking (SDN) platforms. For example, the techniques enable an SDN controller to forward routes received from compute nodes managed by the SDN controller in a manner that avoids a receiving device from receiving duplicate routes that can cause routing problems in a distributed SDN platform.

In some examples, compute nodes may execute virtual routers to implement a forwarding plane for one or more virtual networks having virtual network destinations hosted by the compute nodes. In some examples, the virtual network destinations are virtual workloads. The control nodes of SDN controllers and the virtual routers of the compute nodes communicate to share information to control forwarding of tenant traffic within the virtual networks to reach these virtual network destinations. Compute nodes and control nodes associated with different SDN controllers may be arranged in SDN clusters.

In some examples, in response to receiving a messaging protocol message from a compute node specifying a virtual private network route, a control node of an SDN controller sends, to a routing protocol peer in the SDN system, a virtual private network route to a virtual network destination. In some cases, such as in the case of multiple SDN clusters, duplicate VPN routes can be generated by compute nodes in different SDN clusters. To avoid this issue and distinguish the VPN routes, the virtual private network route includes a route distinguisher generated by the control node based on a physical hardware address of the compute node (e.g., a Media Access Control (MAC) address), rather than based on a network address of the compute node (e.g., an Internet Protocol (IP) address). By generating the route distinguisher based on the L2 physical hardware address, the peer recipients of the virtual private network route can uniquely identify the route. In contrast, when the control node generates the route distinguisher based on a locally unique IP address of the virtual router of the compute node which may not be globally unique across different SDN clusters, the routing protocol peer receiving the virtual private network route from the control node may not recognize the virtual private network route as a distinct route, and as a result traffic forwarding to the destination may be disrupted.

The techniques of this disclosure may provide one or more technical advantages. For example, the route distinguishers based on physical hardware addresses for compute nodes may enable the receiving routing peer, such as an SDN gateway router, to properly distinguish between virtual private network routes that originate from different SDN clusters but have the same subnet addresses. This results in the SDN gateway router properly storing the routes as distinct virtual routes, rather than storing a single route and only selecting one of the compute nodes originating the virtual route while dropping traffic for the other, or improperly load balancing traffic across both compute nodes.

In one example aspect, a method includes generating, by an SDN controller and based on a layer two physical hardware address of a compute node, a route distinguisher value for a network address associated with the compute node, and outputting, by the SDN controller, a route that includes the route distinguisher value and the network address associated with the compute node.

In another example aspect, an SDN controller includes processing circuitry in communication with a memory, the processing circuitry being configured to generate based on a layer two (L2) physical hardware address of a compute node, a route distinguisher value for a network address associated with the compute node; and output a route that includes the route distinguisher value and the network address associated with the compute node.

In a further example aspect, a computer-readable storage medium includes instructions that, when executed, cause one or more processors of an SDN controller to: generate, based on a layer two physical hardware address of a compute node, a route distinguisher value for a network address associated with the compute node; and output a route that includes the route distinguisher value and the network address associated with the compute node.

In yet another aspect, a method includes generating, by a network device, a virtual private network address comprising a route distinguisher value and a network address associated with a compute node, the route distinguisher value based on a layer two physical hardware address of the compute node; and outputting, by the network device, a virtual private network route that includes the virtual private network address.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
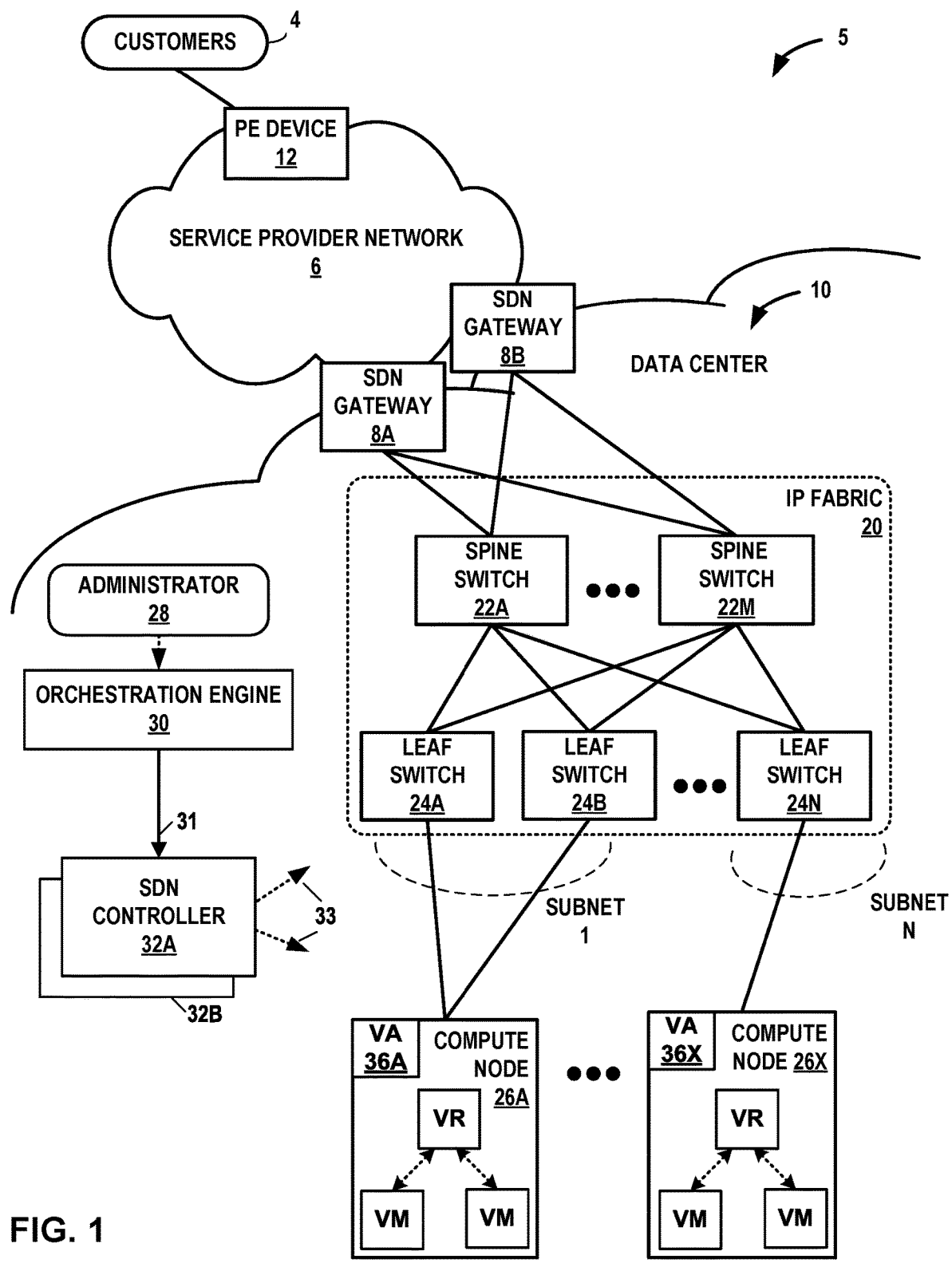
FIG. 1 is a block diagram illustrating an example network system having a data center in which examples of the techniques described herein may be implemented.

FIG. 1 is a block diagram illustrating an example network system 5 having a data center 10 in which examples of the techniques described herein may be implemented. In network system 5, SDN controllers 32A-32B ("SDN controllers 32"), compute nodes 26A-26X ("compute nodes 26"), SDN gateways 8A-8B ("SDN gateways 8"), and nodes of Internet Protocol (IP) fabric 20 operate in accordance with the techniques described herein to ensure customer traffic flow and customer applications executing within the cloud data center continue without interruption.

In general, data center 10 provides an operating environment for applications and services for customers 4 coupled to the data center 10 by service provider network 6. Customers 4 are coupled to service provider network 6 by provider edge (PE) device 12. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via an IP fabric 20 provided by one or more tiers of physical network switches and routers. Compute nodes 26 are servers that function as compute nodes of the data center. In some examples, the terms "compute nodes" and "servers" are used interchangeably herein to refer to compute nodes 26. For example, each of compute nodes 26 may provide an operating environment for execution of one or more customer-specific virtual machines ("VMs" in FIG. 1). IP fabric 20 is provided by a set of interconnected leaf switches 24A-24N (collectively, "leaf switches 24") coupled to a distribution layer of spine switches 22A-22M (collectively, "spine switches 22"). Leaf switches 24 may also be referred to as top-of-rack (TOR) switches. Spine switches 22 may also be referred to as spine switches. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, leaf switches 24 and spine switches 22 provide compute nodes 26 with redundant (multi-homed) connectivity to IP fabric 20. Spine switches 22 aggregate traffic flows and provides high-speed connectivity between leaf switches 24. Leaf switches 24 are network devices that provide layer two (e.g., MAC) and/or layer 3 (e.g., IP) routing and/or switching functionality. Leaf switches 24 and spine switches 22 each include one or more processors and a memory, and that are capable of executing one or more software processes. SDN gateways 8, also referred to as gateway routers, are routing devices that perform layer 3 routing to route network traffic between data center 10 and customers 4 by service provider network 6. SDN gateways 8 provide redundant gateways to forward and receive packets between IP fabric 20 and service provider network 6.

SDN controller 32A provides a logically, and in some cases physically, centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32A operates in response to configuration input received from orchestration engine 30 via northbound Application Programming Interface (API) 31, which in turn operates in response to configuration input received from administrator 28. Additional information regarding SDN controller 32A operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32A manages the network and networking services such load balancing, security, and allocating resources from compute nodes 26 to various applications via southbound API 33. That is, southbound API 33 represents a set of communication protocols utilized by SDN controller 32A to make the actual state of the network equal to the desired state as specified by orchestration engine 30. One such communication protocol may include a messaging protocol such as Extensible Messaging and Presence Protocol (XMPP), for example. For example, SDN controller 32A implements high-level requests from orchestration engine 30 by configuring physical switches, e.g., leaf switches 24, spine switches 22; physical routers; physical service nodes such as firewalls and load balancers; and virtual services such as virtual firewalls in a VM. SDN controller 32A maintains routing, networking, and configuration information within a state database. SDN controller 32A communicates a suitable subset of the routing information and configuration information from the state database to virtual router (VR) agents 36A-36X ("VA" in FIG. 1) on each of compute nodes 26A-26X.

Compute nodes and control nodes associated with different SDN controllers may be arranged in SDN clusters. A cluster is a group of real and/or virtual servers that form an SDN controller, including control nodes, and compute nodes managed by the SDN controller. For example, as shown in FIG. 1, a system may include two independent SDN controllers 32A and 32B, which may each be associated with a different cluster of servers. In some examples, SDN controller 32B manages a second set of compute nodes (not shown). In other examples, SDN controller 32B manages a subset of compute nodes 26, while SDN controller SDN 32A manages a different, non-overlapping subset of compute nodes 26.

Typically, the traffic between any two network devices, such as between network devices within IP fabric 20 or between compute nodes 26 and customers 4 or between compute nodes 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of compute nodes 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of compute node 26A, for instance, from the underlying physical network fabric may include an outer header to allow the physical network fabric to tunnel the payload or "inner packet" to a physical network address for a network interface of compute node 26 that executes the virtual router. The outer header may include not only the physical network address of the network interface of the server but also a virtual network identifier such as a Virtual Extensible LAN (VXLAN) tag or Multiprotocol Label Switching (MPLS) label that identifies one of the virtual networks as well as the corresponding routing instance executed by the virtual router or an interface. That is, the MPLS label can map either to a routing instance or to an interface. An inner packet includes an inner header having a destination network address that conform to the virtual network addressing space for the virtual network identified by the virtual network identifier. In some aspects, the virtual router buffers and aggregates multiple tunneled packets received from the underlying physical network fabric prior to delivery to the appropriate routing instance for the packets.

In the example of FIG. 1, SDN controller 32A learns and distributes routing and other information (such as configuration information) to all compute nodes in the data center 10. The VR agent 36 running inside the compute node, upon receiving the routing information from SDN controller 32A, typically programs the data forwarding element (virtual router) with the forwarding information. SDN controller 32A sends routing and configuration information to the VR agent 36 using a messaging protocol such as XMPP protocol. In XMPP, SDN controllers 32 and agents communicate routes and configuration over the same channel. SDN controller 32A acts as a messaging protocol client when receiving overlay network routes (virtual routes) from a VR agent 36, and the VR agent 36 acts as a messaging protocol server in that case. Conversely, SDN controller 32A acts as a messaging protocol server to the VR agent 36 as the messaging protocol client when the SDN controller sends routes to the VR agent 36, including overlay network routes learned from SDN gateways or other compute nodes.

In accordance with the techniques of this disclosure, control nodes of SDN controller 32A generate and encode route distinguishers for virtual private network addresses using physical hardware addresses for compute nodes that host virtual network destinations. Virtual network destinations may be virtual network endpoints that are compute node workloads and may represent virtual machines and/or containers, for instance. For example, in response to receiving a messaging protocol message from a compute node 26 specifying a VPN route, a control node of SDN controller 32A sends, to one or more routing protocol peers in the SDN system, such as SDN gateways 8, a VPN route to a virtual network destination. Among other fields, the VPN route includes a route distinguisher field having a route distinguisher value generated by the control node.

A route distinguisher is an identifier attached to a route, enabling a router to distinguish to which VPN or virtual private LAN service (VPLS) the route belongs. Each routing instance may have one or more unique route distinguishers (RDs) associated with it. The RD is used to place bounds around a VPN so that the same IP address prefixes can be used in different VPNs without having them overlap. If the instance type is VRF, the route distinguisher statement is required.

As described herein, the control node generates the route distinguisher value based on a layer two (L2) physical hardware address of the compute node (e.g., a Media Access Control (MAC) address), rather than based on a network address of the compute node (e.g., an Internet Protocol (IP) address). The control node may obtain the L2 physical hardware address of the compute node from the compute node via an Address Resolution Protocol or Neighbor Discovery Protocol request and response, or in some examples the MAC address of the compute node may be sent via the same messaging protocol message as included the VPN route.

In another example, a network device can generate a virtual private network address that includes a route distinguisher value and a network address associated with a compute node, the route distinguisher value based on a layer two physical hardware address of the compute node. The network device outputs a virtual private network route that includes the virtual private network address. The network address associated with the compute node is a virtual network address for a virtual network endpoint executed by the compute node.

By generating the route distinguisher based on the L2 physical hardware address, the peer recipients of the virtual route can uniquely identify the route in more situations. In contrast, when SND controller 32 generates a route distinguisher for a route advertised by the compute node 26 based on a locally unique IP address of a virtual router of the compute node 26, which may not be globally unique across different SDN clusters, the routing protocol peer receiving the virtual route from SND controller 32 may not recognize the virtual route as a distinct route, and as a result traffic forwarding to the destination may be disrupted.

The techniques of this disclosure may provide one or more technical advantages. For example, the receiving routing peer, such as an SDN gateway router 8, can properly distinguish between virtual routes (VPN routes) associated with different compute nodes in different SDN clusters that have the same subnet addresses. This results in the SDN gateway router 8 properly storing the routes as distinct virtual routes, rather than storing a single route and only selecting one of the compute nodes originating the virtual route while dropping traffic for the other, or improperly load balancing traffic across both compute nodes.

In addition, if the receiving routing peer is also configured such that it is aware of the new route-distinguisher type, the receiving routing peer could also learn the MAC address contained in the received route. For example, SDN gateway router 8A could learn and store the MAC address of the compute node 26A based on the route-distinguisher of the received route, and SDN gateway router 8A can in turn advertise the MAC address as an EVPN type-2 route, and form a VXLAN tunnel directly with compute node 26A.

Figure 2:
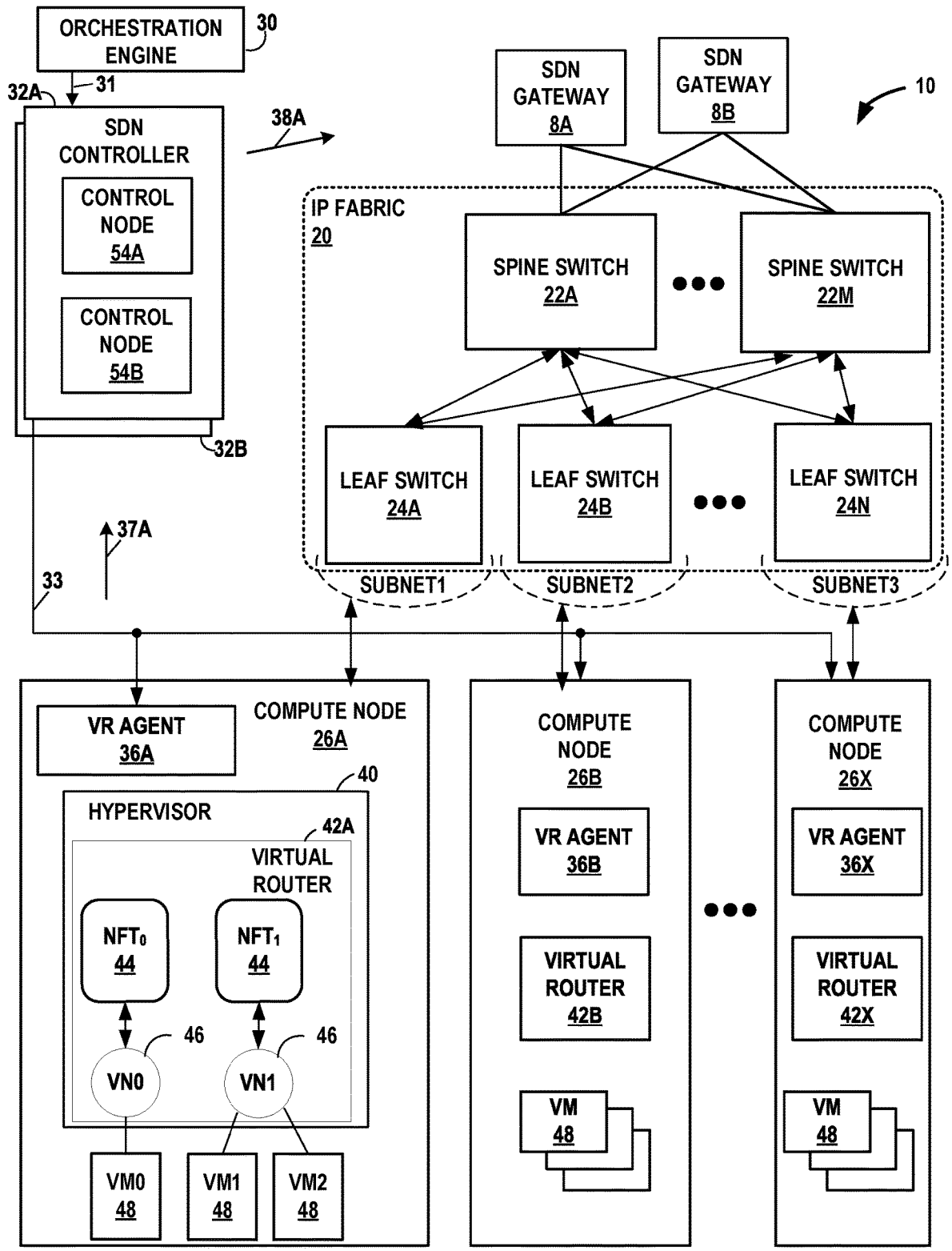
FIG. 2 is a block diagram illustrating an example implementation of the data center of FIG. 1 in further detail, in accordance with the techniques of this disclosure.

FIG. 2 is a block diagram illustrating an example implementation of data center 10 of FIG. 1 in further detail, in accordance with the techniques of this disclosure. In the example of FIG. 2, data center 10 includes compute nodes 26A-26X that include virtual routers 42A-42X (collectively, "virtual routers 42," sometimes referred to as "vrouter"). Responsive to instructions received from SDN controller 32A, virtual routers 42 dynamically create and manage one or more virtual networks ("VN1, VN0") 46 usable for communication between application instances.

In one example, virtual routers 42 execute the virtual network as an overlay network, which provides the capability to decouple an application's virtual address from a physical address (e.g., IP address) of the one of compute nodes 26A-26X ("compute nodes 26") on which the application is executing. Each virtual network may use its own addressing and security scheme and may be viewed as orthogonal from the physical network and its addressing scheme. Various techniques may be used to transport packets within and across virtual networks 46 over the physical network.

Each of virtual routers 42 executes within a hypervisor, a host operating system, or other component of each of compute nodes 26. Each of compute nodes 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of compute nodes 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks VN0-VN1 and represents tenant VMs running customer applications such as Web servers, database servers, enterprise applications, or hosting virtualized services used to create service chains. In some cases, any one or more of compute nodes 26 or another computing device hosts customer applications directly, i.e., not as virtual machines. Virtual machines as referenced herein, e.g., VMs 48, compute nodes 26, or a separate computing device that hosts a customer application may be referred to alternatively as "hosts."

Each interface of VMs 48 running on the host is connected to a VRF that contains the forwarding tables for the corresponding network that contains the IP address of that interface. A vRouter only has VRFs for networks that have interfaces in them on that host, including the Fabric VRF that connects to the physical interface of the host. Virtual networking uses encapsulation tunneling to transport packets between VMs 48 on different hosts, and the encapsulation and decapsulation happens between the Fabric VRF and the VM VRFs.

In general, each of VMs 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications, but is unaware of an IP address of the physical compute node 26A on which the virtual machine is executing. In this way, a "virtual address" is an address for an application that differs from the logical address for the underlying, physical computer system, e.g., compute node 26A in the example of FIG. 2. The virtual addresses may also be referred to herein as "virtual interfaces."

In one implementation, each of compute nodes 26 includes a corresponding one of VR agents 36A-36X that communicates with SDN controller 32A and, responsive thereto, directs virtual router 42 so as to control the overlay of virtual networks 46 and coordinate the routing of data packets within compute node 26. In general, each VR agent 36 communicates with SDN controller 32A, which generates commands to control routing of packets through data center 10.

VR agents 36 execute in user space and operate as a proxy for control plane messages between VMs 48 and SDN controller 32A. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each compute node 26A further includes an orchestration agent (not shown in FIG. 2) that communicates directly with orchestration engine 30. For example, responsive to instructions from orchestration engine 30, the orchestration agent communicates attributes of the particular VMs 48 executing on the respective compute node 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of compute nodes 26. As another example, encapsulation and decapsulation functions are performed at the edge of IP fabric 20 at a first-hop top-of-rack (TOR) switch 24 that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, SDN controller 32A provides a logically centralized controller for facilitating operation of one or more virtual networks within data center 10. For example, SDN controller 32A maintains a routing information base, e.g., one or more routing tables that store routing information for the physical network as well as one or more overlay networks of data center 10. Similarly, virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, virtual machine VM1-48 may send an "inner packet," to virtual router 42A by an internal link. Virtual router 42A uses NFT1 to look up a virtual network destination network address for the packet. NFT1 specifies an outbound interface for virtual router 42A and encapsulation for the packet. Virtual router 30A applies the encapsulation to add a tunnel header to generate an outer packet and outputs the outer packet on the outbound interface, in this case toward leaf switch 24A.

The routing information, for example, maps packet key information (e.g., destination IP information and other select information from packet headers) to one or more specific next hops within the networks provided by virtual routers 42 and IP fabric 20. In some cases, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through IP fabric 20. In this way, network packets associated with any of virtual machines 48 may be transported as encapsulated packet communications via the overlay network.

Each of VR agents 36 may send messages to SDN controller 32A over XMPP sessions, the messages conveying virtual routes to the virtual interfaces (virtual addresses) of the VMs of compute nodes 26. The virtual routes may also be referred to herein as overlay network routes. For example, VR agent 36A sends an XMPP message 37A containing virtual route(s) for compute node 26A. SDN controller 32A receives the messages and stores the virtual routes to overlay routing information, and may in turn advertise one or more of the overlay routes received from a first VR agent 36 to SDN gateways 8 (e.g., via Multi-Protocol extensions for BGP (MP-BGP)), such as via route advertisement 38A. MP-BGP is an extension to BGP that allows different address families to be distributed. SDN controller 32A may also advertise the overlay routes to other control nodes 54, such as to a control node of SDN 32B, if there is a gateway router between the two clusters (as shown in FIG. 3B). In some examples, any of the virtual routes may include a prefix, a next hop address associated with a server of compute nodes 26, and a label or other data to identify a virtual routing and forwarding instance configured at the next hop server. A virtual route may also include a route distinguisher (RD).

One example of an IP-based VPN is described more fully in Rosen et al., "BGP/MPLS IP Virtual Private Networks (VPNs)", Request for Comments 4364, Network Working Group, February 2006, the entire contents of which are incorporated by reference herein. Further details of BGP-signaled IP/VPNs are described in S. Mackie et al., "BGP-Signaled End-System IP/VPNs," Network Working Group Internet-Draft, Dec. 15, 2016, the entire contents of which are incorporated by reference herein. Multiprotocol extensions for BGP are described in T. Bates et al., "Multiprotocol Extensions for BGP-4," Request for Comments 4760, Network Working Group, January 2007, the entire contents of which are incorporated by reference herein.

The route distinguisher is an address qualifier used in the context of BGP-MPLS VPNs. The route distinguisher is used to distinguish between VPNv4 (alternatively, "VPN-IPv4") routes sent by different MP-BGP peers. The route distinguisher is an 8-byte field. Along with the 4-byte IP address, the route distinguisher forms a 12-byte VPNv4 prefix. Since the VPNv4 routes are not stored in the forwarding information base (FIB) of any routing device, they are never used for forwarding decisions. The route distinguisher (RD) is an 8-octet value consisting of two major fields, the Type Field (2 octets) and Value Field (6 octets). The type field determines how the value field should be interpreted. The following Types are defined as shown in Table 1:

TABLE 1

| Type number | Value |
| --- | --- |
| Type 0 | 2-byte ASN + 4-byte subfield |
| Type 1 | 4-byte IP + 2-byte subfield |
| Type 2 | 4-byte ASN + 2-byte subfield |

With a type-2 VPN route, at a control node of the SDN controller, the /32 IP address of a VM launched inside a virtual node is added onto the VRF corresponding to the virtual node (VN). The VRF will have the usual attributes like the Route-Target (RT) and Route Distinguisher (RD). With a type-2 VPN route, the control node generates the RD using the IP of the compute node which is a 4-byte IP address and a 2-byte Virtual-Network ID. The VN-ID is sequentially assigned by the config module and is unique across a cluster for every routing instance. VPNv4 routes are typically advertised with Type-1 RD. For example, for a compute node with the IP address being 10.204.217.108, and a VRF with VN ID being 0, the RD generated by the control node would be, in the absence of the techniques of this disclosure, 10.204.217.108:0.

Every control node of the SDN controller advertises the XMPP routes received from the compute nodes towards other BGP speakers as VPNv4 routes, e.g., route advertisement 38A. The BGP speakers can include other control nodes 54 as well as external BGP speakers such as SDN gateway routers 8.

The SDN architecture described herein supports separation of control-data and management interfaces. It is assumed that the management interfaces are assigned an IP address which is reachable from the outside world and needs to be unique. However, the control-data network is taken from the private addressing space and is local to the cluster. This can be reused across multiple independent clusters.

In response to receiving the route advertisement 38A, SDN gateway 8A, the gateway router, stores the VPN route. SDN gateway 8A may then advertise the route to its routing peers, such as other gateway routers, other SDN controller control nodes, and compute nodes. SDN gateway 8A may forward network traffic in accordance with the stored VPN route. For example, SDN gateway 8A may store the virtual route to a virtual routing and forwarding (VRF) instance for a virtual network that includes the virtual network destination, and forward traffic to the compute node 26A based on the virtual route stored by SDN gateway 8A.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3A:
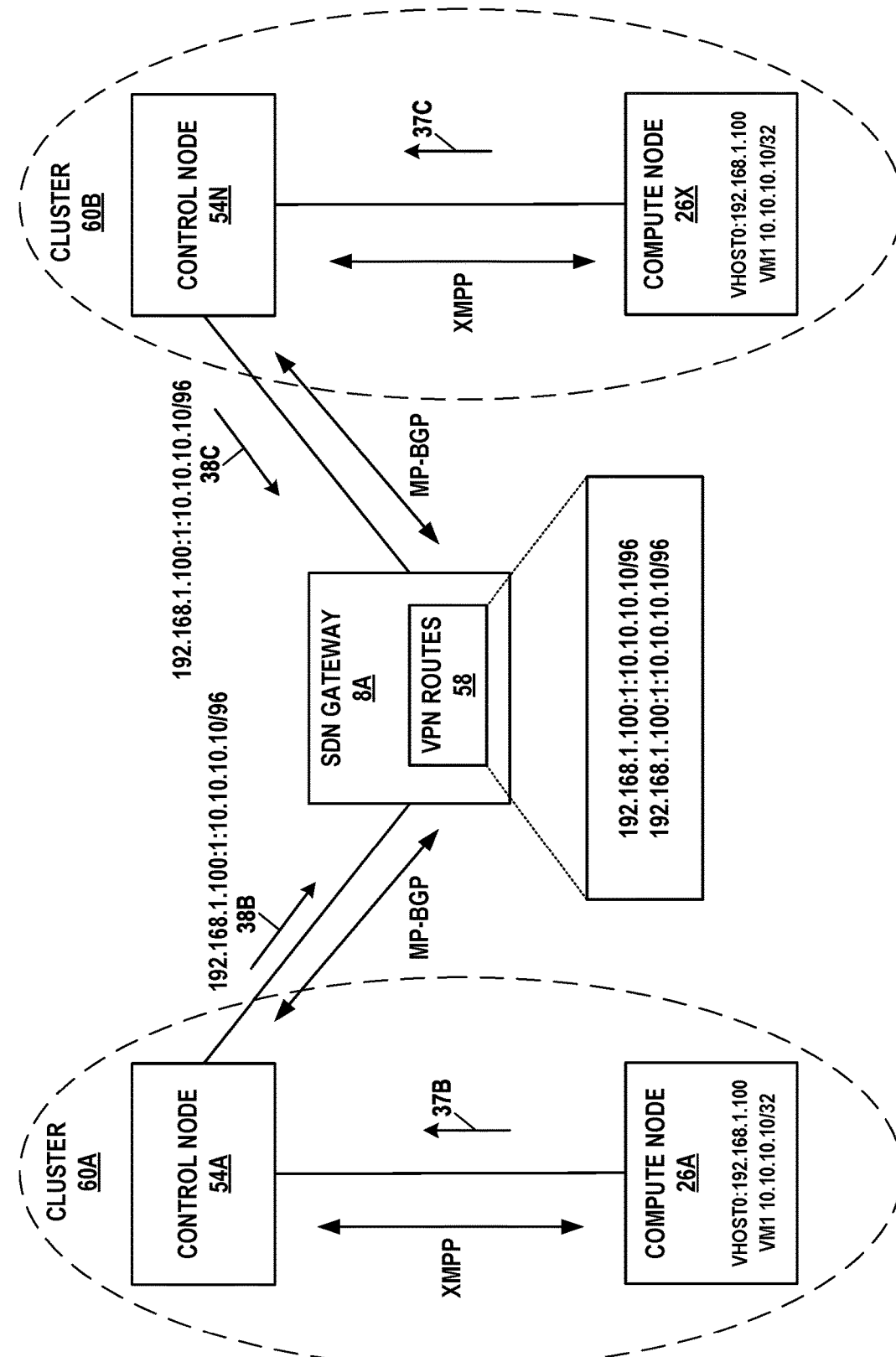
FIGS. 3A and 3B are a block diagram illustrating an example implementation of the data center of FIG. 2 in further detail, in accordance with the techniques of this disclosure.
Figure 3B:
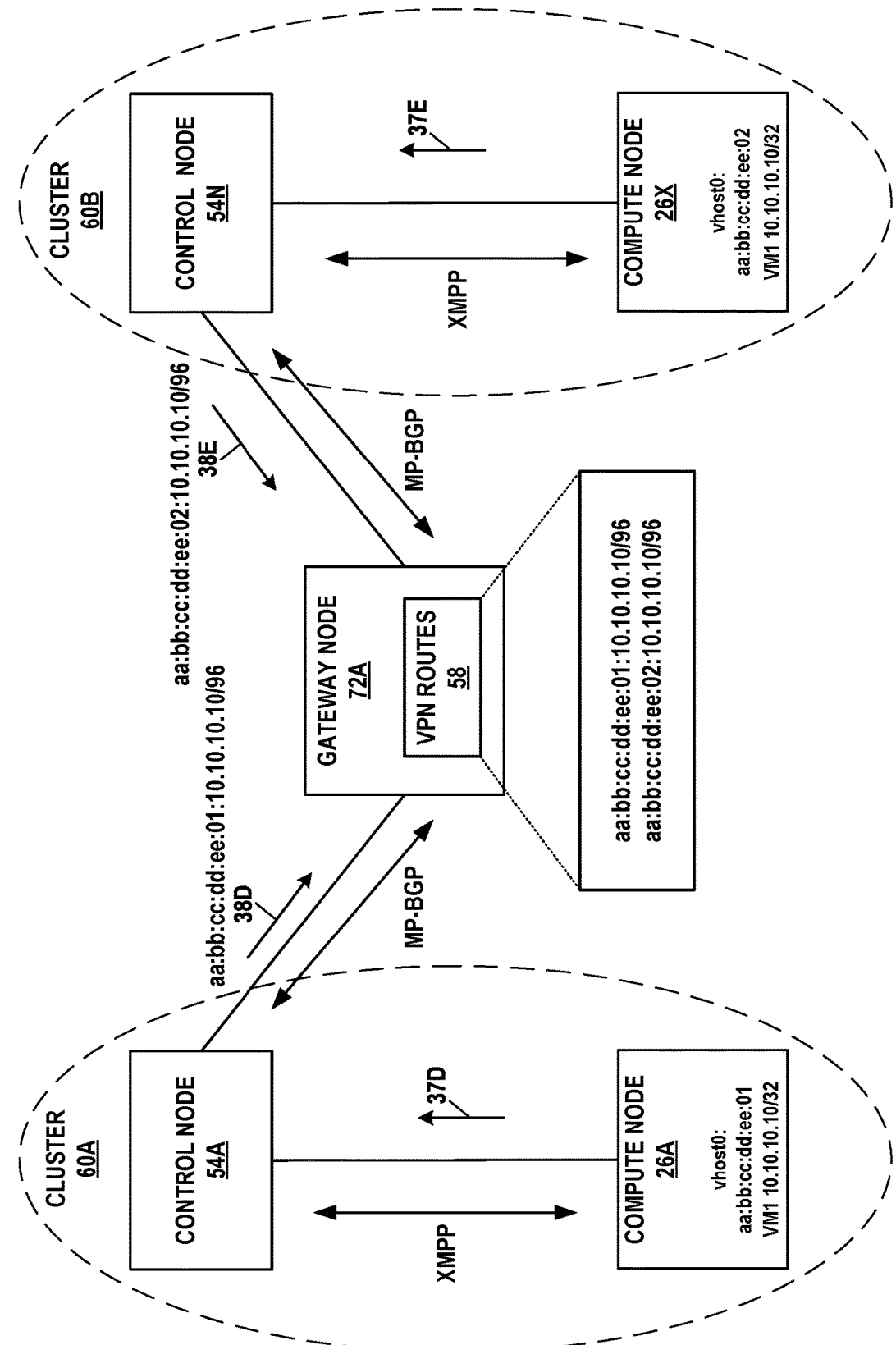

FIGS. 3A and 3B are a block diagrams illustrating examples of control nodes advertising VPN routes in the data center of FIG. 2, in accordance with the techniques of this disclosure. FIG. 3A illustrates a scenario with a single gateway router, SDN gateway 8A, that peers with two different SDN clusters, called cluster 60A and cluster 60B. The same subnet is used as the control-data network in both the clusters. The compute nodes 54A and 54N in cluster 60A and cluster 60B can have the same IP address as well (10.10.10.10/32). There could be a possibility that in both the clusters, the VNs can get the same VN-ID. The vhost0 is a logical interface on the compute node. VN-ID is a 2-byte ID generated by the config node and sent to the control node.

In such a scenario, for the same VM IP addresses, that in response to receiving the respective XMPP messages 37B, 37C from the corresponding compute nodes 26A, 26X, each of the control nodes 54A and 54N would send out similar VPNv4 routes 38B, 38C, via MP-BGP. This would lead to the SDN gateway 8A receiving and storing two identical VPNv4 entries to its routing table of VPN routes 58. SDN gateway 8A would then run the 'best-route selection algorithm' and select only one of the VPN routes 192.168.1.100:1:10.10.10.10/96 to be advertised further. This might lead to a situation where the intended route is not separately advertised out at all because it is interpreted by the SDN gateway 8A as a duplicate. This is a very possible scenario in the distributed SDN architecture, as the two clusters are independent when it comes to address assignment for the control-data network, assignment of VN-ID, and VN subnets.

An alternative option is to use a configuration seeding parameter, such as a 2-byte RDClusterSeed per SDN cluster. The RD would then consist of 2-bytes RDClusterSeed plus 2-bytes from the control IP plus 2-bytes. Though this is closer to solving the problem, it is not completely fail-safe, because there is no guarantee that the RDClusterSeed would be unique across clusters.

FIG. 3B is a block diagram illustrating a gateway node 72A receiving BGP-MP messages 38D, 38E from control nodes 54A, 54N, respectively, where the BGP-MP messages include a route distinguisher generated in accordance with the techniques of this disclosure. To overcome the RD Collision issue completely, this disclosure proposes changing the generation of the RD value by control nodes 54. Rather than using the IP address of the compute node 26, the techniques described herein use a L2 physical hardware address of the compute node, such as the 6-byte MAC address of the control-data interface of the compute node 26. For this, the control node 54 may advertise the RD using both the administrator field and the sub-administrator field for the 6-byte MAC address. This will be advertised as a new type-5 RD route, as shown in Table 2. While the new RD route type is described with respect to type value 5, another value may be used. Values for RD route types are assigned by the Internet Assigned Numbers Authority (IANA).

TABLE 2

| Type (2-bytes) | Value (6-bytes) |
| --- | --- |
| New value-5 | MAC address of the control-data interface of the compute node |

Since the MAC address is unique on any compute node 26 inside any cluster, the uniqueness of the VPNv4 routes is guaranteed. In the example of FIG. 3B, the MAC address is used as a basis for generating the RD value. Compute node 26A has a MAC address of aa:bb:cc:dd:ee:01, and compute node 26X has a MAC address of aa:bb:cc:dd:ee:02. Compute node 26A sends an XMPP message 37D, and compute node 26X sends an XMPP messages 37E. In some examples, XMPP messages 37D, 37E specify the MAC address of the corresponding compute nodes. The control nodes 54 may store the MAC addresses specified in the XMPP messages. In other examples, if the XMPP messages do not specify the MAC addresses and if control nodes 54 do not have a MAC address stored for the compute nodes 26 from which it has received an XMPP message, the control nodes 54 may send an ARP request or neighbor discovery protocol request to the compute nodes 26 to obtain their MAC addresses. Even if the compute node IPs, the VN-ID and the VM-IPs across two different clusters are the same, the VPNv4 routes sent out would be different because of the unique MAC address of the compute nodes. This would lead to the SDN gateway 8A receiving two unique VPNv4 entries, aa:bb:cc:dd:ee:01: 10.10.10.10/96 and aa:bb:cc:dd:ee:02:10.10.10.10/96. There would be no need for the 'best-route selection algorithm,' and the SDN gateway 8A will store and advertise both the routes further.

This results in the SDN gateway router 8A properly storing the two routes as distinct virtual routes, rather than storing a single route and only selecting one of the compute nodes originating the virtual route while dropping traffic for the other, or improperly load balancing traffic across both compute nodes. For example, rather than sending every alternate packet to Cluster 60A and the remaining alternate packets to Cluster 60B, as may occur with load balancing packets to two seemingly identical routes advertised by different control nodes, SDN gateway router 8A will be able to correctly forward traffic to the right cluster and destination, resulting in improved network functions and user experience.

Although described for purposes of example in terms of SDN clusters (a collection of control node server(s) and compute node server(s)), in some examples, the techniques of this disclosure can be applied in systems that do not necessarily involve multiple SDN clusters. For example, one VM in a cluster may need to communicate with a bare metal server (BMS) that is managed by some routing device. In this case, the techniques of this disclosure can apply to VM-to-BMS communications.

Figure 4:
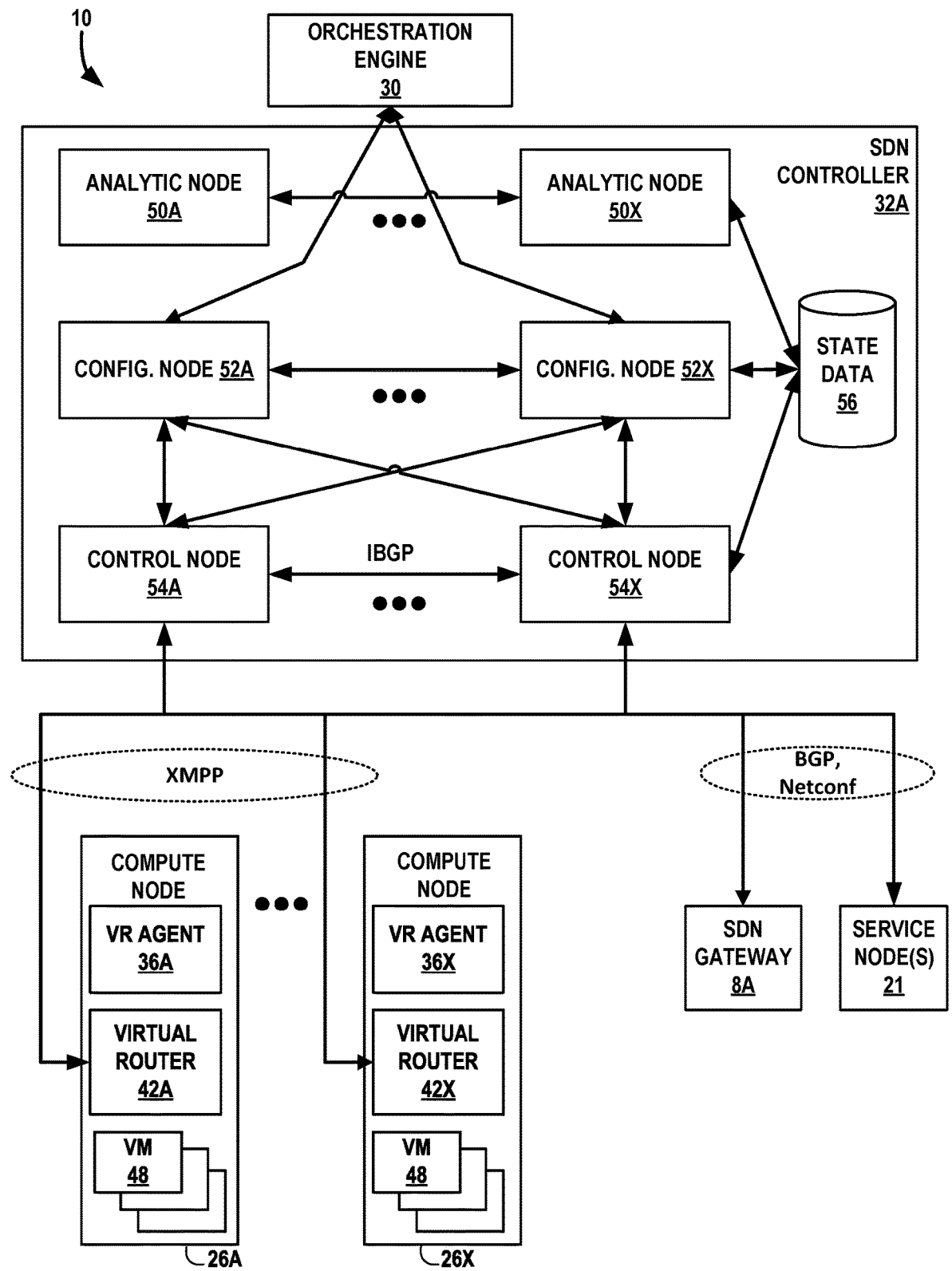
FIG. 4 is a block diagram illustrating an example implementation of the data center of FIG. 2 in further detail.

FIG. 4 is a block diagram illustrating an example implementation of the data center of FIG. 2 in further detail. In the example of FIG. 4, SDN controller 32A includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the nodes 50, 52, and 52 may be implemented as a separate software process, and the nodes may be distributed across multiple hardware computing platforms that provide an environment for execution of the software. Moreover, each of the nodes maintains state database 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower level models suitable for interacting with network elements, such as physical switches 22, 24 and VR agents 36. Configuration nodes 52 keep a persistent copy of the configuration state of SDN controller 32A within state database 56 ("STATE DATA 56").

Control nodes 54 implement a logically centralized control plane responsible for maintaining ephemeral network state. Control nodes 54 interact with each other and with network elements, such as VR agents 36 and virtual routers 42 of compute nodes 26, to ensure that the network state is eventually consistent with desired state as specified by orchestration engine 30. In general, control nodes 54 receive configuration state information of SDN controller 32A from configuration nodes 52, and exchange routes with each other via IBGP to ensure that all control nodes 54 have the same network state. Further, control nodes 54 exchange routes with VR agents 36 on compute nodes 26 via XMPP.

Control nodes 54 also communicate the configuration state information, such as routing instances and forwarding policy, to VR agents 36, e.g., via XMPP, for installation within respective virtual routers 42. In some examples, control nodes 54 may proxy traffic on behalf of compute nodes 26. These proxy requests may be received over XMPP. Further, control nodes 54 exchange routes with SDN gateway 8A via BGP, and exchange the configuration state of SDN controller 32A with service nodes 21 via Netconf. As described herein, control nodes 54 are configured to generate, based on a layer two (L2) physical hardware address of a compute node 26, a route distinguisher value for a network address associated with the compute node 26, and output a route that includes the route distinguisher value and the network address associated with the compute node.

Configuration nodes 52 provide a discovery service that customers 4 may use to locate various services available within the network. For example, if VR agent 36A attempts a connection with control node 54A, it uses a discovery service provided by configuration nodes 52 to discover the IP address of control node 54A. Clients executing on VMs 48 may use local configuration, DHCP or DNS to locate the service discovery server within configuration nodes 52.

In some examples, configuration nodes 52 present a northbound API that interfaces with orchestration engine 30. Orchestration engine 30 uses this interface to install configuration state using the high-level data model. Configuration nodes 52 further include a message bus to facilitate communications amongst internal components. Configuration nodes 52 further include a transformer that discovers changes in the high-level model of orchestration engine 30 and transforms these changes into corresponding changes in the low-level data model managed by SDN controller 32A. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

The architecture of data center 10 illustrated in FIG. 4 is shown for purposes of example only. The techniques as set forth in this disclosure may be implemented in the example data center 10 of FIG. 4, as well as other types of data centers not described specifically herein. Nothing in this disclosure should be construed to limit the techniques of this disclosure to the example architecture illustrated by FIG. 4.

Figure 5:
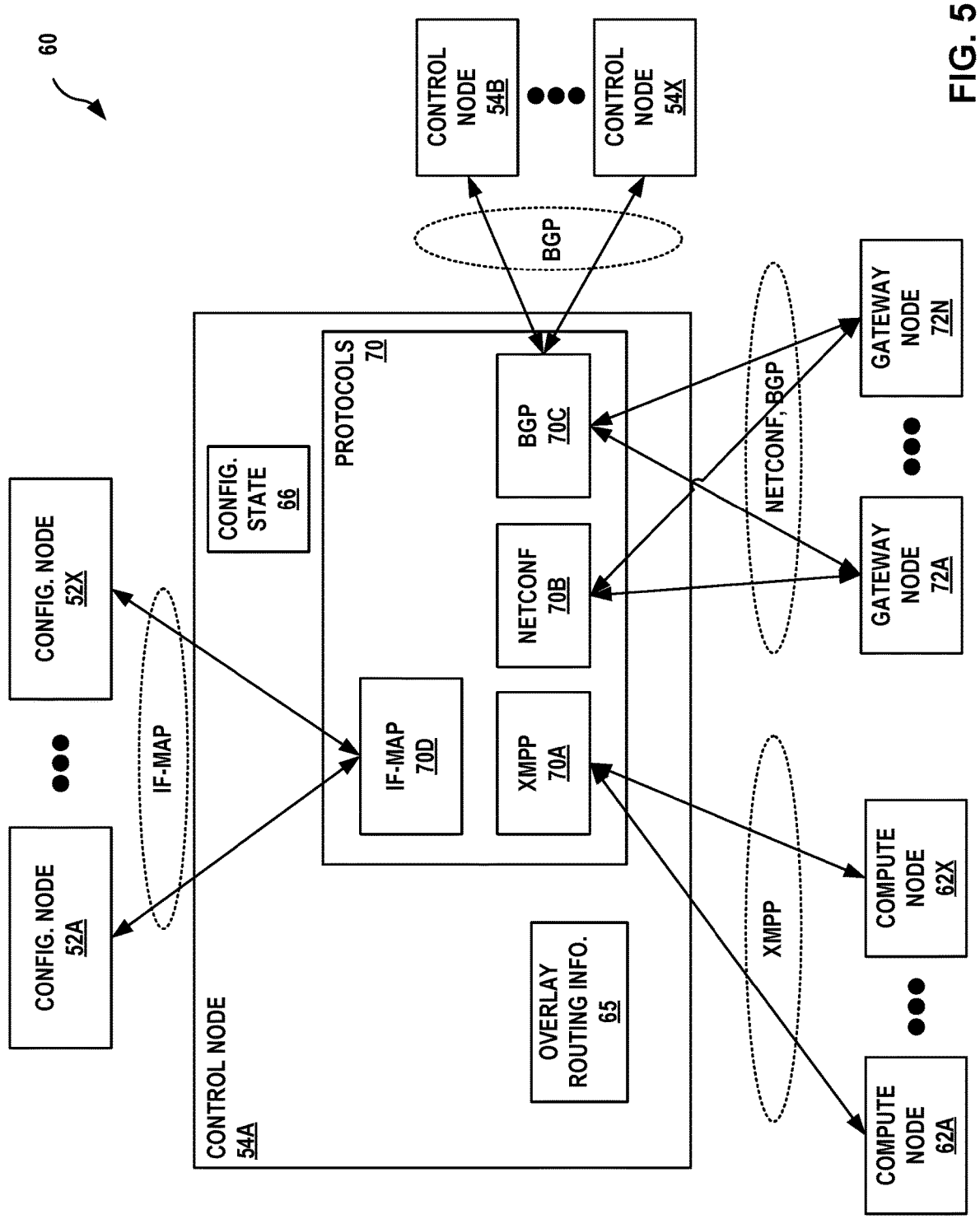
FIG. 5 is a block diagram illustrating an example of a control node of an SDN controller in further detail in accordance with the techniques of this disclosure.

FIG. 5 is a block diagram illustrating an example of a control node of an SDN controller in further detail in accordance with the techniques of this disclosure. Control node 54 is configured to communicate with multiple other types of nodes, including configuration nodes 52A-52X ("config. nodes 52"), other control nodes 54B-54X, compute nodes 62A-62X ("compute nodes 62"), and gateway nodes 72A-72N ("gateway nodes"). Control node 54 also communicates with IP fabric 20, which, as described herein, may be made up of devices including spine switches and leaf switches, for example. Control node 54A provides an operating environment for protocols 70 to execute. Protocols 70 may include, for example, an XMPP process 70A, a NETCONF process 70B, a BGP process 70C, and an IF-MAP process 70D.

The control nodes receive configuration state from the configuration nodes using IF-MAP. The control nodes exchange overlay network routes with other control nodes using IBGP to ensure that all control nodes have the same overlay network state. The control nodes exchange overlay network routes (e.g., VPN routes) with the vRouter agents on the compute nodes using XMPP. The control nodes also use XMPP to send configuration state such as routing instances and forwarding policy. The control nodes proxy certain kinds of traffic on behalf of compute nodes. These proxy requests are also received over XMPP. The control nodes exchange overlay network routes with the gateway nodes (routers and switches) using BGP. The control nodes also send configuration state using NETCONF.

Control node 54A receives configuration information from one or more of config. nodes 52 using Interface to Metadata Access Points (IF-MAP) process 70D. IF-MAP process 70D may include circuitry for executing software instructions for sending and receiving communications from config nodes 52 in accordance with the IF-MAP protocol. IF-MAP process 70D stores the configuration information received from configuration nodes 52 to configuration state 66 ("CONFIG.STATE 66").

Control node 54A exchanges BGP messages with BGP peers, including control nodes 54B-54X and gateway nodes 72 using BGP process 70C. Gateway nodes 72 may include one or more SDN routers such as SDN gateways 8. BGP process 70C may implement multiprotocol BGP (MP-BGP), for example. BGP process 70C may include circuitry for executing software instructions for sending and receiving BGP messages with control nodes 54B-54X in accordance with the BGP protocol, including MP-BGP update messages. BGP process 70C stores overlay network routes received from BGP route advertisements from gateway nodes 72 and control nodes 54B-54X to overlay routing information 65.

Control node 54A exchanges messages with compute nodes using XMPP process 70A in accordance with XMPP. Control node 54A exchanges the messages via XMPP sessions. Compute nodes 62 may correspond to compute nodes 26 of FIGS. 1-3. XMPP process 70A may include circuitry for executing software instructions for exchanging XMPP messages with compute nodes 62 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein. Control node 54A (and more specifically, XMPP process 70A of control node 54A) may serve as an XMPP client or an XMPP server relative to one of compute nodes 62, depending on the context. For example, control node 54A may act as an XMPP server, and compute nodes 62 may be XMPP clients that subscribe to information published by control node 54A, such as configuration information from configuration state 66 for individual compute nodes 62 and routing information from overlay routing information 65 that pertains to individual compute nodes 62.

As another example, control node 54A may act as an XMPP client to one or more of compute nodes 62 as XMPP servers, in which control node 54A subscribes to information published by compute nodes 62, such as routing information learned by compute nodes 62 from other sources. XMPP process 70A receives overlay network routes from compute nodes 62A via an XMPP session and stores the overlay network routes to overlay routing information 65. Overlay network routes learned by XMPP process 70A may be leaked to BGP process 70C, and BGP process 70C in turn may send to its BGP peers (e.g., other compute nodes or SDN gateways) BGP routing advertisements that advertise the overlay network routes in overlay routing information 65 learned from compute nodes 62 via XMPP. In some examples, NETCONF process 70B of control node 54A enables control node 54A to communicate with gateway nodes 72 via the NetConf protocol.

In response to XMPP process 70A receiving an XMPP message from one of compute nodes 62 advertising a route associated with a new VM on the one of compute nodes 62, BGP process 70C generates a route advertisement based on the XMPP message that includes a VPN route for the new VM. For example, this handoff may occur due to the leaking of overlay network routes learned by XMPP process 70A described above. Control node 54A generates a route distinguisher value in accordance with the techniques described herein, based on the MAC address of the corresponding compute node. BGP process 70C includes in the route advertisement the route distinguisher value for the VPN route. Control node 54A outputs the route advertisement to one or more of gateway nodes 72A-72N, such as via an MP-BGP session.

In some examples, XMPP messages received by control node 54A from compute nodes may specify the MAC address of the corresponding compute nodes. Control node 54A may store the MAC addresses specified in the XMPP messages, such as to overlay routing information 65. In other examples, if the XMPP messages do not specify the MAC addresses and if control node 54A does not have a MAC address stored for the compute nodes 26 from which it has received an XMPP message, control node 54A may send an ARP request to the compute nodes 26 to obtain their MAC addresses.

Figure 6A:
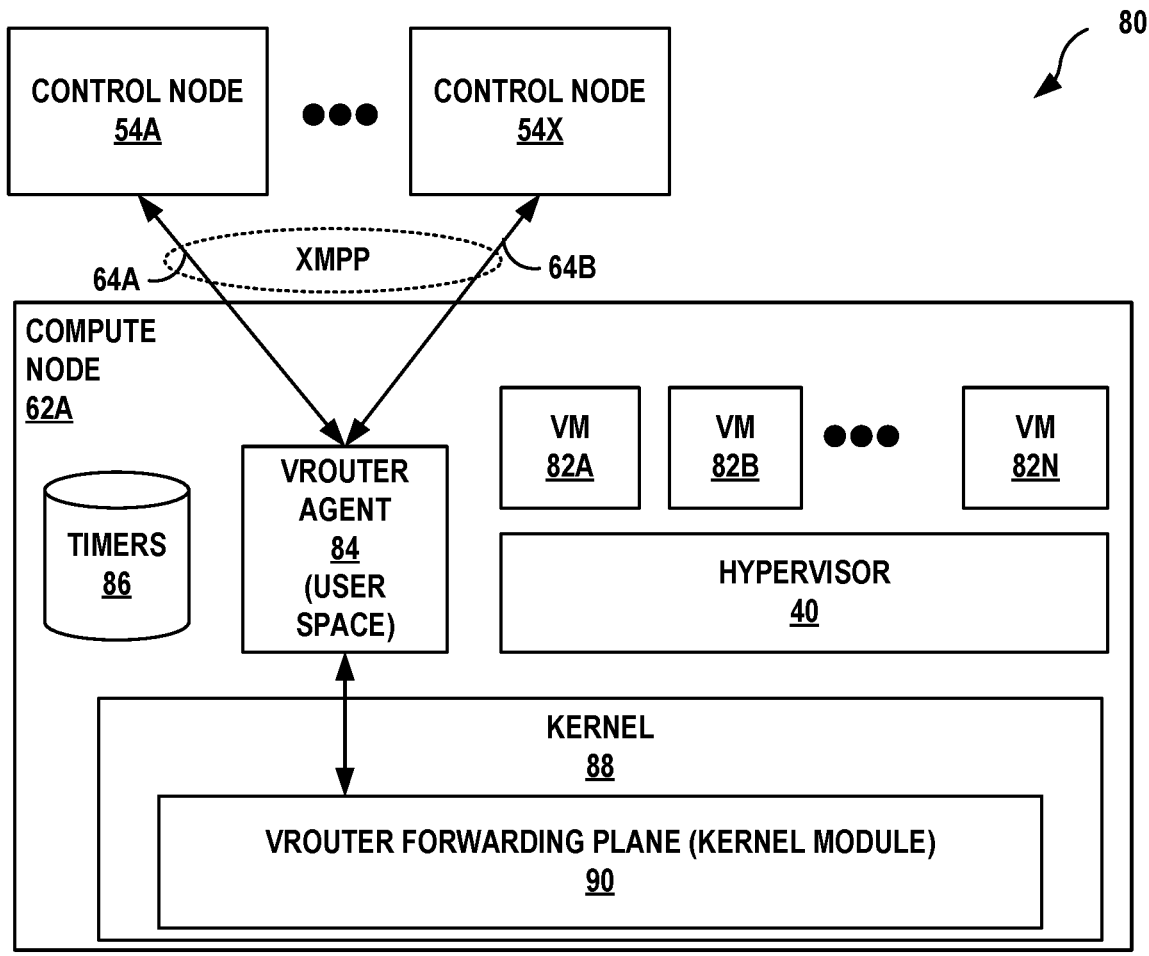
FIGS. 6A-6B are block diagrams illustrating examples of a compute node in further detail, in accordance with the techniques of this disclosure.
Figure 6B:
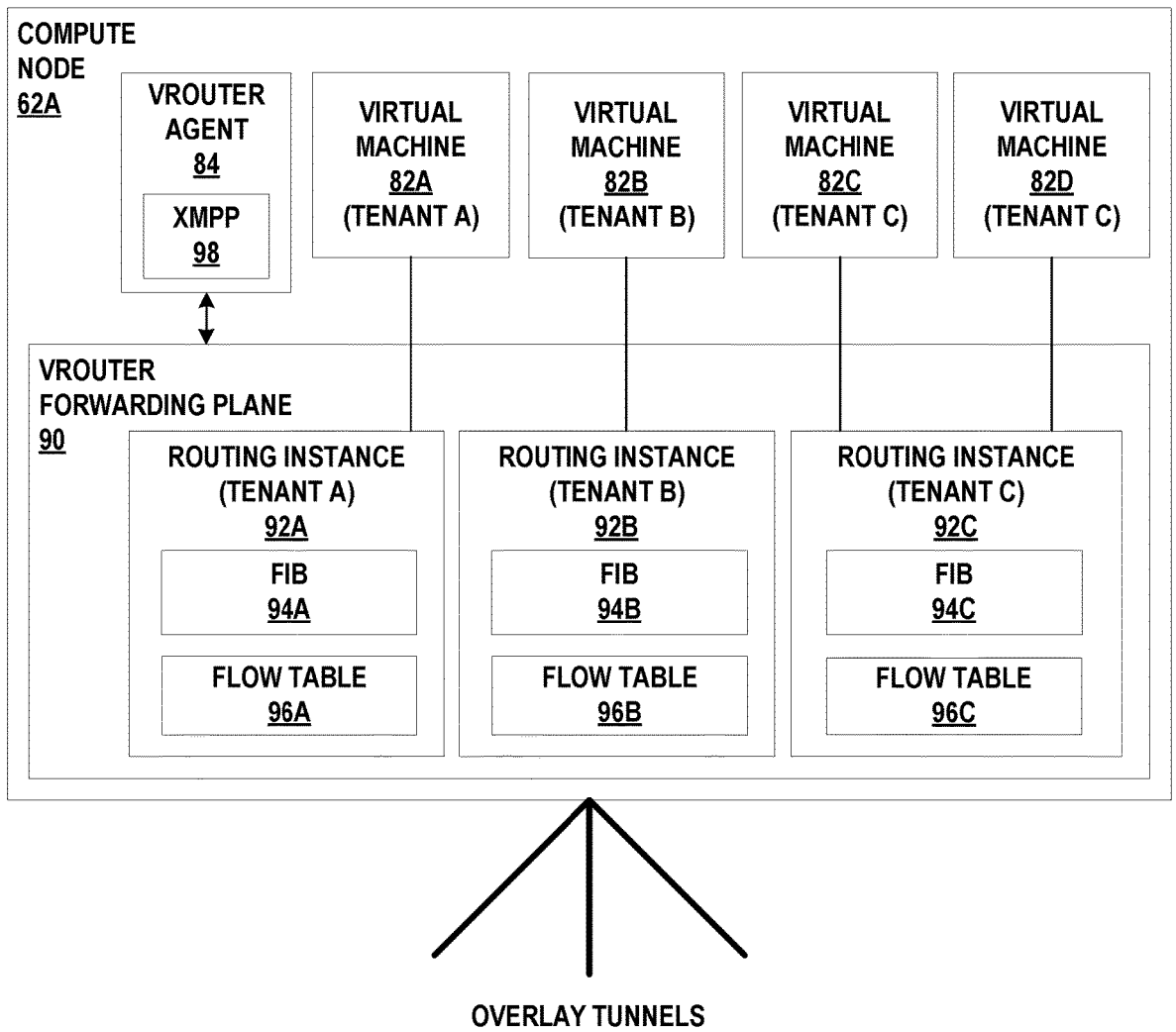

FIGS. 6A-6B are block diagrams illustrating examples of a compute node in further detail, in accordance with the techniques of this disclosure. In the example of FIGS. 6A-6B, the compute node is compute node 62A of FIG. 5. Compute node 62A may be one of compute nodes 26 of FIGS. 1-4. Compute node 62A hosts VMs 82A-82N ("VMs 82"), and may be, for example, a general-purpose x86 server. VMs 82 are tenant VMs running customer applications such as Web servers, database servers, enterprise applications or hosting virtualized services used to create service chains, for example. In one example configuration, Linux is the host operating system (OS).

Two components in a compute node implement a virtual router; namely, the vRouter agent 84 and the vRouter forwarding plane 90. The vRouter forwarding plane 90 is located in the kernel (e.g., Linux), and the vRouter agent 84 is the local control plane.

The vRouter agent 84 is a user space process running inside the kernel. The vRouter agent 84 acts as the local, lightweight control plane and is responsible for the following functions. The vRouter agent 84 exchanges control state such as routes with the control nodes 54 using XMPP sessions. The vRouter agent 84 receives low-level configuration state such as routing instances and forwarding policy from the control nodes 54 using XMPP. The vRouter agent 84 reports analytics state such as logs, statistics, and events to the analytics nodes 50 (FIG. 3). The vRouter agent 84 installs forwarding state into the vRouter forwarding plane 90. The vRouter agent 84 may discover the existence and attributes of VMs in cooperation with a Nova agent of compute node 62A (not shown). The vRouter agent 84 applies forwarding policy for the first packet of each new flow and installs a flow entry for the flow in the flow table of the forwarding plane. The vRouter agent 84 may proxy one or more of DHCP, ARP, DNS, and MDNS, for example. Additional proxies may be included in some implementations. Each vRouter agent 84 is connected to at least two control nodes 54 for redundancy in an active-active redundancy model.

In some examples, vRouter agent 84 receives an ARP request from a control node 54, requesting a MAC address of a control-data interface of the compute node 62A. VRouter agent 84 generates an ARP reply that specifies the MAC address.

FIG. 6B illustrates the virtual router ("vRouter") forwarding plane 90 of compute node 62A in further detail. The vRouter forwarding plane 90 runs as a loadable kernel process (e.g., in Linux). The vRouter forwarding plane 90 is responsible for the following functions: vRouter forwarding plane 90 enables encapsulating packets to be sent to the overlay network and decapsulating packets to be received from the overlay network.

Routing instances 92A-92C, for respective tenants A, B, and C, represent virtual routing and forwarding instances ("VRFs"). Routing instances 92A-92C ("routing instances 92") include corresponding FIBs 94A-94C ("FIBs 94") and flow tables 96A-96C ("flow tables 96"). VRouter forwarding plane 90 may include an additional VRF called a "fabric VRF" (not shown). The vRouter forwarding plane 90 assigns packets to a routing instance 94. Packets received from the overlay network are assigned to a routing instance based on the MPLS label or Virtual Network Identifier (VNI). Virtual interfaces to local virtual machines are bound to routing instances 92. The vRouter forwarding plane 90 does a lookup of the destination address in the forwarding information base (FIB) 94, also known as a forwarding table, and forwards the packet to the correct destination. The routes may be Layer 3 IP prefixes or Layer 2 MAC addresses, for example. A MAC address for a control-data interface of compute node 62A may be stored in one or more of the routing instances 92.

A forwarding policy can be applied using a flow table 96: The vRouter forwarding plane 90 matches packets against the flow table and applies the flow actions. The vRouter forwarding plane 90 sends the packets for which no flow rule is found (that is, the first packet of every flow) to the vRouter agent 84, which then installs a rule in the flow table 96. The vRouter forwarding plane 90 sends certain packets such as DHCP, ARP, MDNS to the vRouter agent for proxying.

Each interface of VMs 82 running on the host is connected to a VRF (routing instance 92) that contains the forwarding tables for the corresponding network that contains the IP address of that interface. A vRouter only has VRFs for networks that have interfaces in them on that host, including the Fabric VRF that connects to the physical interface of the host. Virtual networking uses encapsulation tunneling to transport packets between VMs 82 on different hosts, and the encapsulation and decapsulation happens between the Fabric VRF and the VM VRFs (routing instances 92).

When a new virtual workload is created, an event is seen in the orchestration engine 30 and sent into SDN controller 32A, which then sends requests to the vRouter agent 84 for routes to be installed in the VRFs for virtual networks, and the vRouter agent 84 then configures them in the forwarder.

The logical flow for configuring networking on a new VM with a single interface is as follows: Networks and network policies are defined in either the orchestrator or Networking using UI, CLI, or REST API. A network is primarily defined as a pool of IP addresses which will be allocated to interfaces when VMs are created.

A VM is requested to be launched by a user of the orchestrator, including which network its interface is in. The orchestrator selects a host for the new VM to run on, and instructs the vrouter agent 84 on that host to fetch its image and start the VM. Events or API calls are received from the networking service of the orchestrator instructing to set up the networking for the interface of the new VM that will be started. These instructions are converted into REST calls and sent to the SDN controller 32. The SDN controller 32 sends a request to the vRouter agent 84 for the new VM virtual interface to be connected to the specified virtual network. The vRouter agent 84 instructs the vRouter forwarding plane 90 to connect the VM interface to the routing instance 92 for the virtual network. The routing instance 92 (VRF) is created, if not present, and the interface is connected to it.

The vRouter agent 84 starts the VM which will usually be configured to request IP addresses for each of its interfaces using DHCP. The vRouter agent 84 proxies the DHCP requests and responds with the interface IP, default gateway, and DNS server addresses. Once the interface is active and has an IP address from DHCP, the vRouter agent 84 will install routes to the VM's IP address and MAC address with a next hop of the VM virtual interface. The vRouter agent 84 assigns a label for the interface and installs a label route in the MPLS table (e.g., FIB 94).

VRouter agent 84 uses XMPP process 98 to establish an XMPP session with a control node of the SDN controller. XMPP process 98 of vRouter agent 84 learns overlay network routes to virtual interfaces (virtual addresses) from VMs 82, and stores these as virtual routes for the virtual interfaces to FIBs 94. XMPP process 98 sends XMPP messages via the XMPP session to control nodes 54 to advertise the overlay network routes. For example, the vRouter agent 84 sends an XMPP message 37A to the SDN controller 32 containing a route to the new VM. The route has a next hop of a network address of the server that the vRouter is running on (e.g., an IP address including IPv4 or IPv6), and specifies an encapsulation protocol using the label that was just allocated. The next hop may include the MAC address.

The control node of the SDN controller 32 distributes the route to the new VM to the other vRouters with VMs in the same network and in other networks, as allowed by network policy. The SDN controller sends routes for the other VMs, as allowed by policy, to the vRouter of the new VM. For example, the vRouter agent 84 XMPP process 98 receives virtual routes advertised by SDN controller's control node 54A, and stores the overlay network routes to overlay routing information 104 and one or more of FIBs 94. At the end of this procedure, the routes in the VRFs of all the vRouters in the data center have been updated to implement the configured network policies, taking account of the new VM.

Figure 7:
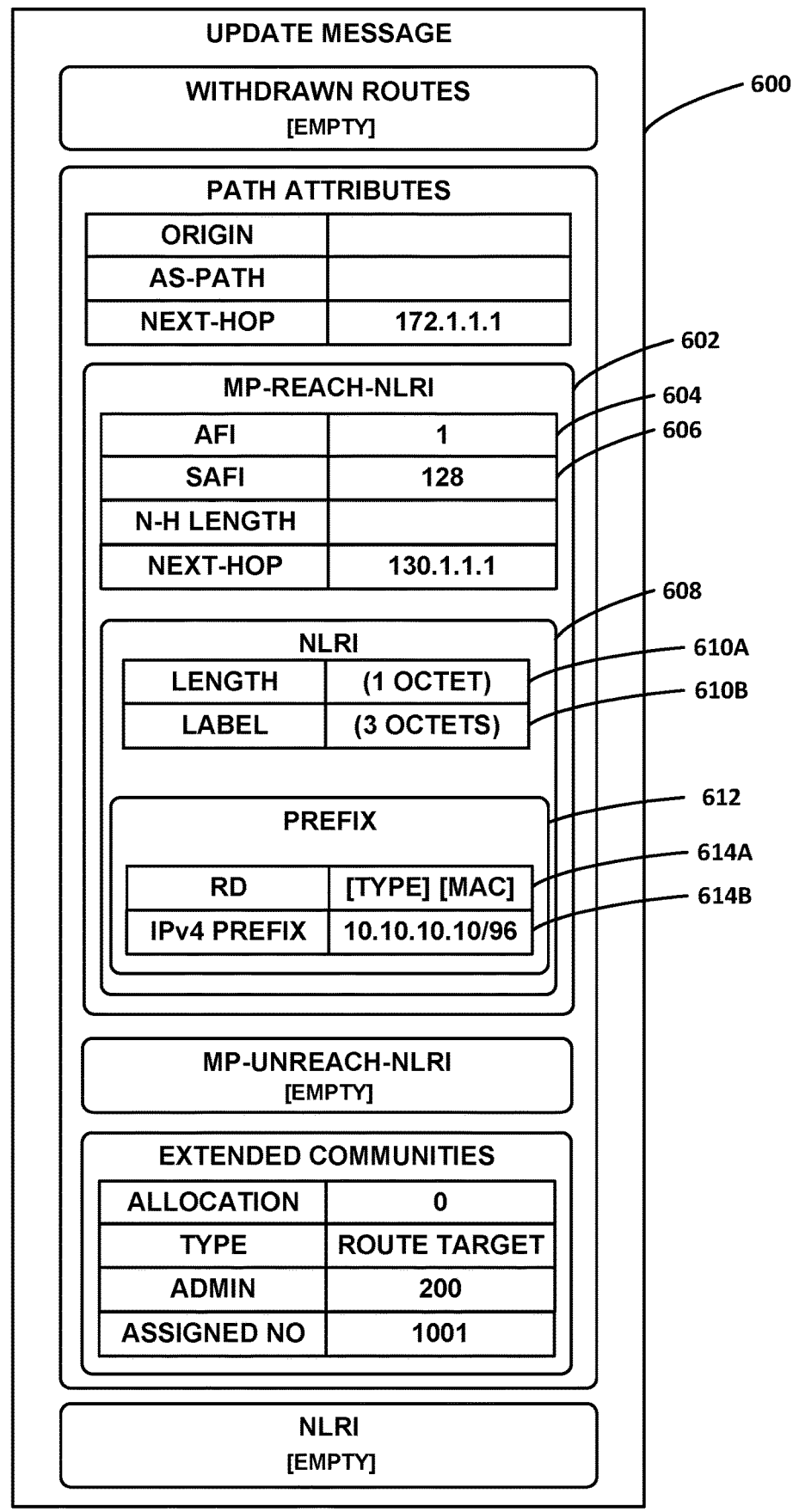
FIG. 7 is a block diagram illustrating an example route advertisement for a virtual private network address that includes, in accordance with techniques described herein, a route distinguisher generated based on a physical hardware address associated with a compute node.

FIG. 7 is a block diagram illustrating an example route advertisement for a virtual private network address that includes, in accordance with techniques described herein, a route distinguisher generated based on a physical hardware address associated with a compute node. BGP UPDATE message 600 is a route advertisement that conforms to MP-BGP and includes MP-REACH-NLRI field 602 advertising a host route for a virtual machine in a compute node of a distributed SDN system. Extended BGP UPDATE message 600 may represent an example instance of route advertisement 38A illustrated in FIG. 2. For purposes of illustration, extended BGP UPDATE message 600 is illustrated using glyphs, rather than with packet fields.

MP-REACH-NLRI field 602 of extended BGP UPDATE message 600 specifies an Address Family Identifier (AFI) field 604 having a value of 1 in this example to indicate IPv4 network addresses, along with a value for the Subsequent AFI (SAFI) field 606 having a value of 128 to identify the virtual route as a L3 VPN route. AFI field 604 and SAFI field 606 may in some instances have different values, as assigned by a private party or by the Internet Assigned Numbers Authority (IANA). In some examples, an IPv6 prefix may be used instead of an IPv4 prefix.

Network Layer Reachability Information (NLRI) field 608 specifies a host route for the compute node virtual machine having IP address 10.10.10.10, identified in prefix field 612. Length field 610A specifies a length of the prefix value in prefix field 612. Label field 610B specifies an MPLS label. Prefix field 612 includes a route distinguisher field 614A that specifies a route distinguisher value generated by the control node originating BGP UPDATE message 600, the route distinguisher value based on the L2 physical hardware address of the compute node that originated the route. The route distinguisher field 614A may also specify a Type field (illustrated with value "[TYPE]") having a value that indicates that the Value field of the route distinguisher field 614A (illustrated with value "[MAC]") is generated based on the layer two physical hardware address. For example, the route distinguisher type will have a value (e.g., 5) to specify that the route carries a route distinguisher being generated based on a MAC address of the compute node, as described herein. The route distinguisher field 614A may use both an administrator field and a sub-administrator field for a 6-byte MAC address, with the RD field including the new type (2-byte) and MAC (6 byte). The IPv4 prefix field 614B specifies a value of the IPv4 prefix.

Figure 8:
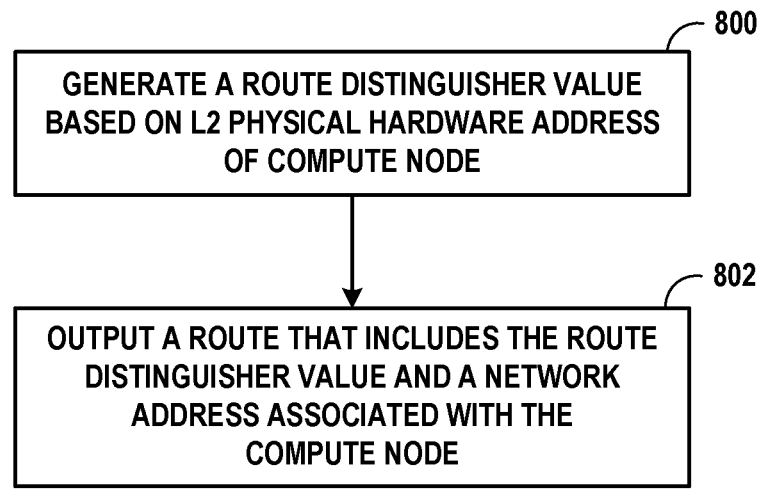
FIG. 8 is a flowchart illustrating example operation of an SDN controller in accordance with the techniques of this disclosure.

FIG. 8 is a flowchart illustrating example operation of an SDN controller in accordance with the techniques of this disclosure. FIG. 8 may illustrate example operation of an SDN controller such as SDN controller 32A or 32B of FIG. 1-2 or 4, for example. FIG. 8 may illustrate example operation of a control node 54A-54N of FIGS. 3-5, for example. A control node of an SDN controller generates, based on a layer two physical hardware address of a compute node, a route distinguisher value for a network address associated with the compute node (800). For example, control node 54A may generate the route distinguisher value in response to receiving an XMPP message from a compute node. Control node 54A may obtain the L2 physical hardware address (e.g., MAC address) of the compute node from overlay routing information, or from the XMPP message itself, or from the compute node in response to an ARP request. The MAC address of the compute node may be stored in a fabric VRF of the compute node.

The control node of the SDN controller outputs a route that includes the route distinguisher value and the network address associated with the compute node (802). For example, the route may be a route advertisement in accordance with a routing protocol, such as BGP UPDATE message 600 of FIG. 7. The route may specify a VPN route, such as a VPNv4 route. The network address may be the IP prefix associated with the compute node.

Although described for purposes of example in terms of an SDN controller, in some examples the techniques of FIG. 8 may be implemented by a network device other than an SDN controller. In another example, a network device can generate a virtual private network address that includes a route distinguisher value and a network address associated with a compute node, the route distinguisher value based on a layer two physical hardware address of the compute node. The network device outputs a virtual private network route that includes the virtual private network address. The network address associated with the compute node is a virtual network address for a virtual network endpoint executed by the compute node.

Figure 9:
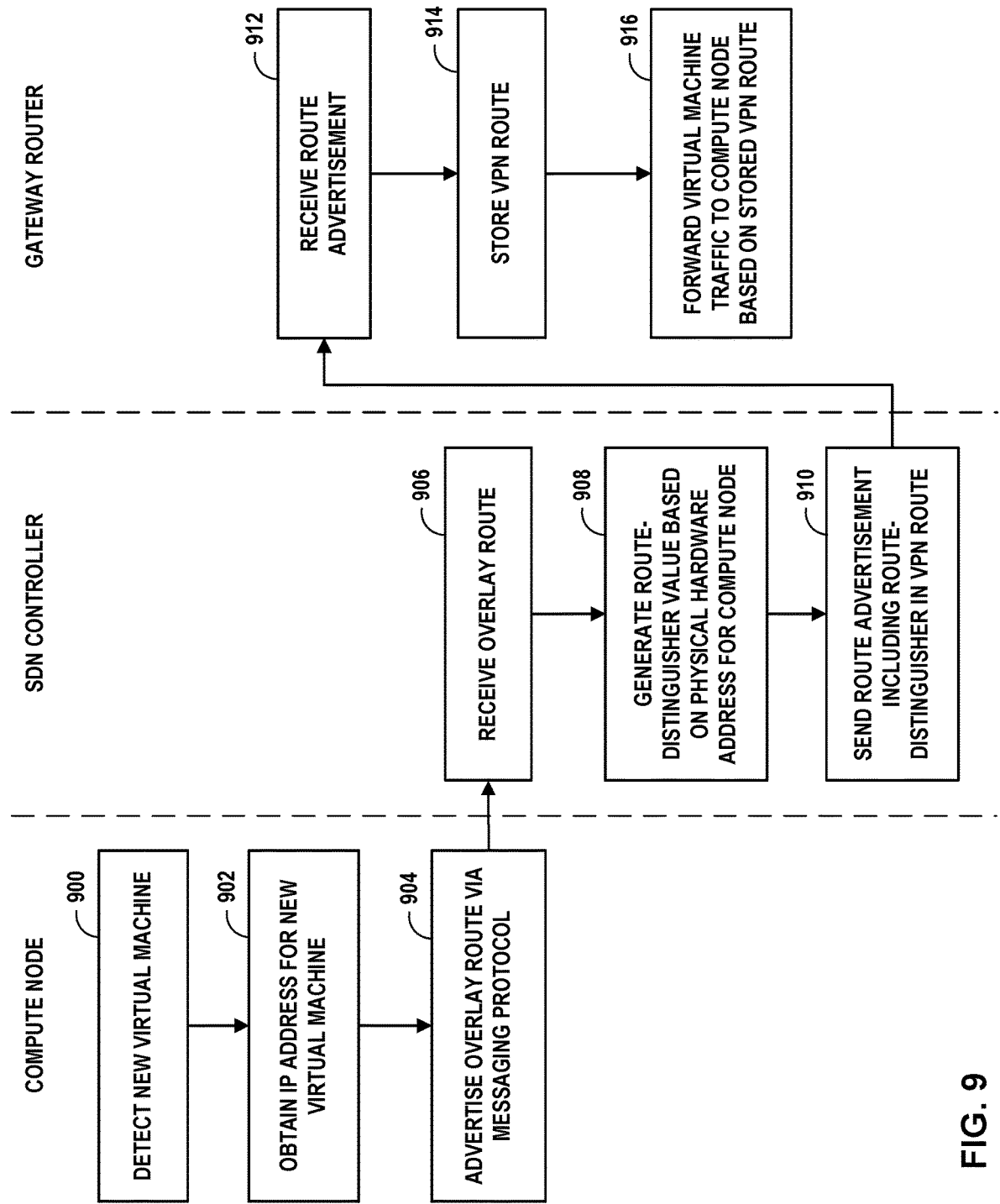
FIG. 9 is a flowchart illustrating example operation of network devices, in accordance with the techniques of this disclosure.

FIG. 9 is a flowchart illustrating example operation of network devices, in accordance with the techniques of this disclosure. FIG. 9 may illustrate example operation of a compute node such as any of compute nodes 26 of FIG. 1-4 or any of compute nodes 62 of FIG. 5-6B. FIG. 9 may illustrate example operation of an SDN controller such as SDN controller 32A or 32B of FIG. 1-2 or 4, for example. FIG. 9 may illustrate example operation of a control node 54A-54N of FIGS. 3-5 and 6A, for example. FIG. 9 may also illustrate example operation of a gateway router, such as SDN gateway 8A-8B of FIGS. 1-2, 3B or gateway nodes 72 of FIG. 5.

The compute node detects a new virtual machine (900), such as described above. The compute node obtains an IP address for new virtual machine (902). The compute node advertises an overlay network route via a messaging protocol (904), such as XMPP, to the control node of the SDN controller. The control node of the SDN controller control node receives the overlay network route from the compute node via the XMPP session (906). In response to receiving the overlay network route, the control node generates a route distinguisher value based on a physical hardware address for compute node (908). In some examples, the control node obtains the physical hardware address of the compute node via the same virtual route via the XMPP advertisement. In other examples, the control node obtains the physical hardware address of the compute node via an ARP request to the compute node.

After generating the route distinguisher value, the control node sends a route advertisement including the route distinguisher value generated based on the physical hardware address of the compute node (910). The route advertisement includes the route distinguisher value as part of a VPN route for the compute node. The gateway router receives the route advertisement containing the VPN route including the route distinguisher (912). In response to receiving the route advertisement, the gateway router stores the VPN route (914). The gateway router may then advertise the VPN route to its routing peers, such as other gateway routers, other SDN controller control nodes, and compute nodes. The gateway router may forward network traffic in accordance with the stored VPN route. For example, the gateway router may store the VPN route to a virtual routing and forwarding (VRF) instance for a virtual network that includes the virtual network destination, and forward traffic to the compute node based on the VPN route stored by the gateway router. The gateway router then forwards virtual machine traffic to the compute node based on the stored VPN route (916).

If the gateway router receives another route from a different SDN cluster or a BMS, the two VPN routes would not be identical because they would have different route distinguishers, and thus these would be stored by the gateway router as distinct routes, and traffic would not be load balanced across them.

In some examples, such as if the receiving gateway router is also configured such that it is aware of the new route-distinguisher type, the gateway router may include other functionality based on its ability to learn the MAC address from the new route distinguisher.

While the techniques are described primarily with respect to advertising virtual network addresses for virtual machines executing on compute nodes, the techniques are similarly applicable to other types of workloads, such as containers. For instance, a container may execute as part of a pod workload on a compute node, the pod being assigned a virtual network address by the SDN platform and operating as a virtual network destination.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, process or components may be implemented together or separately as discrete but interoperable logic devices. Depiction of different features as process or units is intended to highlight different functional aspects and does not necessarily imply that such process or units must be realized by separate hardware or software components. Rather, functionality associated with one or more process or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
    generating, by a software-defined networking (SDN) controller and as a function of a layer two (L2) physical hardware address of a network interface of a compute node, a route distinguisher value for distinguishing a network address associated with the compute node; and
    outputting, by the SDN controller, a route that includes the route distinguisher value and the network address associated with the compute node.

2. The method of claim 1, further comprising:
    receiving, by the SDN controller, the network address associated with the compute node in an overlay network route for a virtual network destination,
    wherein generating the route distinguisher value comprises generating the route distinguisher value in response to receiving the overlay network route for the virtual network destination.

3. The method of claim 2, further comprising:
    receiving, by the SDN controller, the L2 physical hardware address in the overlay network route for the virtual network destination.

4. The method of claim 2, wherein receiving the network address in the overlay network route comprises receiving a messaging protocol message specifying the network address.

5. The method of claim 4, and wherein the messaging protocol message is received via an Extensible Messaging and Presence Protocol (XMPP) session between a control node and a virtual router agent of the compute node, and wherein outputting the route comprises outputting the route via a Multi-Protocol Border Gateway Protocol (MP-BGP) session between the control node and a routing protocol peer device.

6. The method of claim 1, further comprising:
    receiving the L2 physical hardware address in a message from the compute node, in response to an address resolution protocol request or a neighbor discovery protocol request.

7. The method of claim 1, wherein the route includes a route distinguisher field that specifies a Type field and a Value field, wherein data contained in the Type field indicates that data contained in the Value field of the route distinguisher field is generated as a function of a L2 physical hardware address, and wherein data contained in the Value field is the route distinguisher value generated as a function of the L2 physical hardware address of the network interface of the compute node.

8. The method of claim 1, wherein the compute node comprises a physical server, wherein the network interface is a control-data interface of the physical server, and wherein the L2 physical hardware address comprises a Media Access Control (MAC) address of the control-data interface of the physical server.

9. The method of claim 1, wherein the network address comprises one of an Internet Protocol version four or Internet Protocol version six address.

10. The method of claim 1, wherein outputting the route comprises outputting the route to a gateway router.

11. The method of claim 10, wherein the network address associated with the compute node is a virtual network address for a virtual network endpoint executed by the compute node, the method further comprising:
 storing, by the gateway router, the route to a virtual routing and forwarding (VRF) instance for a virtual network that includes the virtual network endpoint; and
 forwarding, by the gateway router, traffic to the compute node based on the route stored by the gateway router.

12. The method of claim 10, wherein the route is a virtual private network (VPN) route, the method further comprising:
 learning, by the gateway router in response to receiving the VPN route from the SDN controller and based on data in the VPN route indicating the route distinguisher value was generated as a function of the L2 physical hardware address of the compute node, the L2 physical hardware address of the network interface of the compute node based on the route distinguisher value included in the VPN route; and
 based on learning the L2 physical hardware address of the network interface of the compute node:
  advertising, by the gateway router, the L2 physical hardware address of the network interface of the compute node in an Ethernet VPN route; and
  forming, by the gateway router, a Virtual Extensible Local Area Network (VXLAN) tunnel directly with the compute node.

13. A software-defined networking (SDN) controller comprising processing circuitry in communication with a memory, the processing circuitry being configured to:
 generate, as a function of a layer two (L2) physical hardware address of a network interface of a compute node, a route distinguisher value for distinguishing a network address associated with the compute node; and
 output a route that includes the route distinguisher value and the network address associated with the compute node.

14. The SDN controller of claim 13, wherein the processing circuitry is further configured to:
 receive the network address associated with the compute node in an overlay network route for a virtual network destination; and
 generate the route distinguisher value in response to receiving the overlay network route for the virtual network destination.

15. The SDN controller of claim 14, wherein the processing circuitry is further configured to receive the L2 physical hardware address in the overlay network route for the virtual network destination.

16. The SDN controller of claim 14, wherein the overlay network route comprises a messaging protocol message specifying the network address, and wherein the messaging protocol message is received via an Extensible Messaging and Presence Protocol (XMPP) session between a control node and a virtual router agent of the compute node, and
 wherein to output the route comprises outputting the route via a Multi-Protocol Border Gateway Protocol (MP-BGP) session between the control node and a routing protocol peer device.

17. The SDN controller of claim 13, wherein the route includes a route distinguisher field that specifies a Type field and a Value field, wherein data contained in the Type field indicates that data contained in the Value field of the route distinguisher field is generated as a function of a L2 physical hardware address, and wherein data contained in the Value field is the route distinguisher value generated as a function of the L2 physical hardware address of the network interface of the compute node.

18. The SDN controller of claim 13, wherein the compute node comprises a physical server, wherein the network interface is a control-data interface of the physical server and wherein the L2 physical hardware address comprises a Media Access Control (MAC) address of the control-data interface of the physical server.

19. The SDN controller of claim 13, wherein the network address associated with the compute node is a virtual network address for a virtual network endpoint executed by the compute node, wherein to output the route comprises output the route to a gateway router to be stored by the gateway router to a virtual routing and forwarding (VRF) instance for a virtual network that includes the virtual network endpoint, such that the gateway router can forward traffic to the compute node based on the route.

20. A method comprising:
 generating, by a network device, a virtual private network route address comprising a network address associated with a compute node and a route distinguisher value for distinguishing the network address associated with a compute node, wherein the route distinguisher value is a function of a layer two physical hardware address of a network interface of the compute node; and
 outputting, by the network device, the virtual private network route that includes the network address and the route distinguisher value.

21. The method of claim 20, wherein the network address associated with the compute node is a Layer 3 (L3) virtual network address for a virtual network endpoint executed by the compute node.

* * * * *